United States Patent

[11] 3,621,442

[72] Inventors Willis J. Racht
South Milwaukee;
Paul Pfister, Milwaukee, both of Wis.

[21] Appl. No. 774,146
[22] Filed Nov. 7, 1968
[45] Patented Nov. 16, 1971
[73] Assignee Allen-Bradley Company
Milwaukee, Wis.

[54] TERMINAL CONNECTION OF ELECTRONIC DEVICES
10 Claims, 3 Drawing Figs.

[52] U.S. Cl. .......... 338/309,
29/619, 174/68.5, 317/101 CC, 317/234 M
[51] Int. Cl. .......... H01c 7/00
[50] Field of Search .......... 174/68.5;
317/101 B, 101 C, 101 CC, 101 CM, 234 (5.3);
29/621, 619, 620, 626; 338/307–309, 314

[56] References Cited
UNITED STATES PATENTS

| | | | |
|---|---|---|---|
| 3,322,655 | 5/1967 | Garibotti et al. | 29/621 UX |
| 3,377,697 | 4/1968 | Hobbs | 338/308 X |

*Primary Examiner*—Darrell L. Clay
*Attorneys*—Richard C. Steinmetz, Jr. and Arnold J. Ericsen

ABSTRACT: A process involving and connection for a chromium based electrically functioning portion supported on a substrate. A connecting layer is deposited and is bonded to the selected parts of the portion and comprises metals preferably taken from the group consisting of titanium, zirconium, tantalum and combinations thereof. A second layer is deposited over the connecting layer which will permit soldering if the connection is to be a termination or will become a conductor for interconnection on the substrate. This deposition of the second layer begins before the deposition of the connecting layer is phased out.

INVENTORS
WILLIS J. RACHT
PAUL PFISTER
By Richard C. Steinmetz Jr.
ATTORNEY

TERMINAL CONNECTION OF ELECTRONIC DEVICES

BACKGROUND OF THE INVENTION

One of the more significant considerations in making a successful and satisfactory electrical device, especially a device which can be characterized as a miniature or microminiature device, is to be found in the connection with the electrically functioning portion of the device. This portion may take various forms, such as an active or a passive element, e.g. as a resistor, or the portion may be characterized as a conductor of the device. MOreover, this portion may be found in a discrete electrical device or as a part or parts of a circuit which are located on a common base or substrate.

These connections must establish satisfactory electrical as well as mechanical performance characteristics for the final product. For example, the connection may significantly affect the electrical properties of the electrically functioning portion which existed before the connection was made. Also, it is important that the connection be maintained during the life of the product and does not experience such disadvantages as mechanical separation between the connection material and the electrically functioning portion which can appear as peeling or separation.

The connections referred to above may take the form of a termination in which outside connection to the electrically functioning portion is established, e.g. a lead wire. This connection may also take the form of an interconnection to be found in the electrical device itself so as to interconnect desired electrically functioning portions of the device.

One of the more popular metals used for this electrically functioning portion is chromium which can be used with varying combinations of other metals. Nevertheless, the use of chromium presents a particular problem for satisfactory connection. While the whole of this problem cannot be expressed with certainty, it is theorized, as will be pointed out with more detail below, that a chromium-oxide layer forms on the surface of the chromium-containing portion; and to satisfactorily provide connection with this portion, it is necessary to penetrate that oxide layer. It is the purpose of this invention to solve this connection problem with a more efficient and more economical connection and process than has heretofore been known.

An example of the use of chromium for purposes of electrically functioning portions can be found in the U.S. Pat. No. 2,953,484, dated Sept. 20, 1960, with an inventor, Bernhard F. Tellkamp. In this patent, the use of chromium and cobalt is used to provide an electrical resistance device. The connection suggested by this patent takes the form of a terminal which is metallurgically held to the chromium-containing resistor element.

SUMMARY OF THE INVENTION

The invention disclosure concerns the connection for the electrically functioning portion of an electrical device which can occur with the termination or interconnection of that portion. More particularly, the invention concerns a chromium-containing portion which may include a combination of chromium and other metals such as chromium-cobalt. In order to obtain satisfactory connection with this chrome-containing layer, that portion of the layer which is to be connected is exposed, in a deposition process, so as to permit the deposition of a connecting layer which comprises certain predetermined metals. These metals are preferably taken from the group consisting of titanium, zirconium, tantalum and combinations thereof. It is theorized that the inclusion of such metals in the connecting layer results in penetration of the chromium-oxide layer covering the electrically functioning portion so as to provide the desired electrical and mechanical connection properties. Preferably, this deposition process step is accomplished by vacuum deposition.

While the above-mentioned connecting layer will provide satisfactory connection with the chromium-containing layer, it may not provide a desirable layer for material which is to be attached to the connection in order to conduct electrical current to and from the electrically functioning portion. An example of such materials and related process materials involved is found in the well-known and inexpensive process of soldering. The above-mentioned connection layer will contain metals which are not conducive to known soldering processes.

This invention includes structure and process to provide a satisfactorily bonded third layer which is deposited onto the connection layer connecting the chromium-containing portion. More specifically, and as is particularly relevant to the soldering process, the invention provides for depositing an additional layer comprising metals which will support or will be compatible with the soldering process. The deposition process for these metals has been most satisfactorily demonstrated by first depositing the connecting layer and overlapping the deposition of the third layer such that before the deposition of the connection layer is discontinued, the deposition of the third layer is initiated. The product includes an intermediate layer comprising materials of both the connecting layer and the third layer, which intermediate layer provides satisfactory electrical and mechanical connection.

The third layer may also serve as a conductor between electrically functioning portions. The connection and process mentioned above is advantageously applicable to interconnection as well as an electrical device which has connections which take the form of both a termination and interconnection.

DESCRIPTION OF PREFERRED EMBODIMENT

Figure 1:
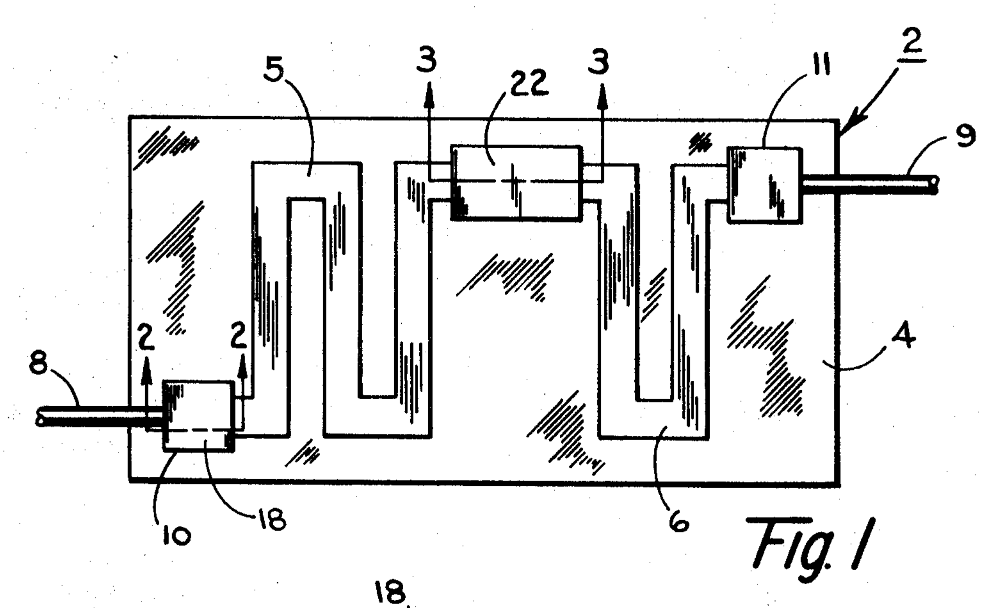
FIG. 1 shows a representative electrical device to illustrate the connection of this invention as it would appear at both a termination and an interconnection.

The following description is directed to a preferred embodiment and incorporates the above-mentioned drawings. It is to be understood that this description is by no way limiting as to the scope of the invention. More particularly, it is to be understood that the scope of the invention is to be found in the appended claims. Also, it will be noted that the relative size of the various parts and portions in the drawings are shown in order to suggest relative dimensions; but these drawings are not intended to represent actual or accurate relative dimensions.

Since this invention concerns connection to electrically functioning portions of an electrical device, the FIG. 1 shows such a device 2 having a substrate 4 which supports the electrically functioning portions shown as resistive layers 5 and 6. The substrate may be an electrical glass, or a glazed or unglazed ceramic material with particular attention directed to the substrate's relatively smooth surface and inability to react with layers such as 5 and 6.

A resistive layer 5 is connected to a connection means such as a lead wire 8 at a termination generally identified as 10. This same construction is to be found as the resistive layer 6 is connected to the lead wire 9 at the termination generally identified as 11.

Figure 2:
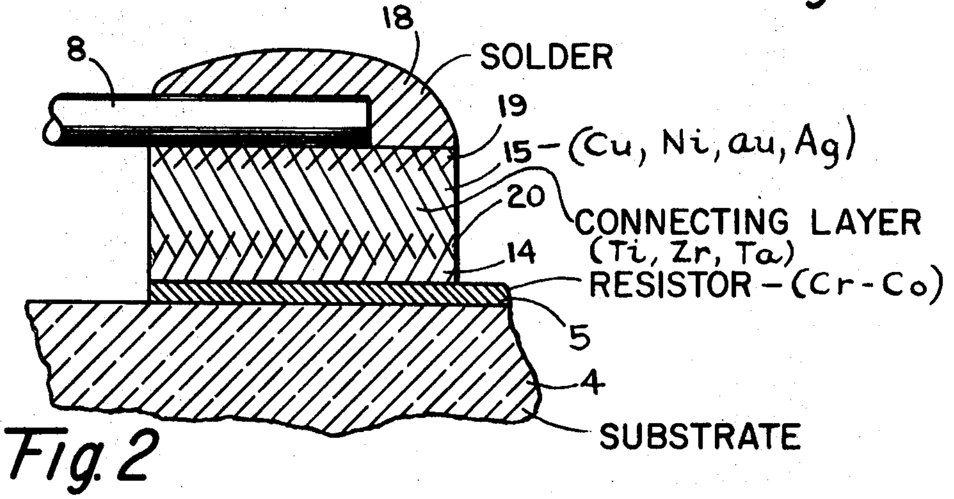
FIG. 2 is a cross-sectional view taken at the section line 2—2 of FIG. 1 to show the invention as it might appear in a termination.

The FIG. 2 shows the termination in more detail by way of a cross-sectional view. Here, the resistive layer 5 is shown supported by the substrate 4 on the one side and bonded to a connecting layer 14.

As has been previously noted, the invention concerns an electrically functioning portion such as the resistive layer 5 which contains chromium. This chromium may be combined with other metals in order to provide desired electrical properties. For example U.S. Pat. No. 2,953,484 previously mentioned teaches the combination of cobalt with 40 to 80 percent by weight of chromium. For purposes of better understanding, a representative resistive layer 5 may be 400 angstroms in thickness.

Connecting problems with a chromium containing portion or resistive layer 5 have been encountered. It has now been determined that the use of certain metals in connecting layer 14 will substantially solve this connection problem. More specifically, satisfactory connection results have been achieved by the use of certain metals, at least in part, in the connecting layer 14. Such metals are preferably taken from the group consisting of titantium, zirconium, tantalum and combinations thereof and should comprise at least 20 percent by weight of the metals in layer 14.

While it is not completely understood how or why the satisfactory connection conditions can be accomplished by the above-mentioned metals, it is theorized that the resistive layer 5, with its chromium content produces a chromium oxide layer on its surface. Therefore, any connection must provide for penetration of this chromium oxide layer. The particular metals suggested for the connecting layer 14, or at least for a portion of the connecting layer 14, are believed to act as oxygen gettering metals. Thus, the metals are able to penetrate the chromium-oxide layer. For purposes of better understanding, a representative connecting layer 14 may be 1,000 angstroms in thickness. It has been determined that satisfactory connection with the resistive layer 5 will require a minimum of 200 angstroms in thickness for the connecting layer 14.

The particular connecting layer 14, which provides the desired connection with the resistive layer 5, may comprise the properties for desired connection to outside electrical current connectors such as the lead 8. Soldering is a known and economical process which may not be possible with the connecting layer 14. Therefore, the third layer 15 may be added with the content of the third layer 15 being selected so as to permit the desired connection with an outside conductor such as the lead 8. Specifically, it has been found that a third layer 15, made from metals compatible with the solder process such as copper, nickel, silver and gold or other known metals of similar properties, can be used. As is shown in the FIG. 2, the lead 8 is then attached to the layer 15 to complete the termination by means of solder 18 which produces an interface 19 with the third layer 15. The preferred solder process can best be described as a tin-based solder process. A most significant consideration in selecting a solder process is damage or detrimental affect which the heat necessary for soldering will cause the electric device. For this reason, the tin-based solder process is preferred.

The process for making the connection such as shown in FIG. 2 is preferably a vacuum deposition process. In this case, it has been demonstrated that both the layers 14 and 15 can be deposited by one vacuum deposition step. In the process, the substrate, with its resistive layer 5, is introduced into the vacuum chamber and the resistive layer 5 is masked so that only the area of the layer 5 which is to be involved with the connection is exposed. This masking utilizes a well-known process which may include the application of a photoresist. Then deposition can begin. The metals which are to make up the layers 14 and 15 are located in the vacuum chamber at independent source points. First, the deposition of the connecting layer 14 is begun. Then, assuming it is desirous to add a layer such as third layer 15, the deposition of layer 15 is begun. It is important to note here that the deposition of the layer 15 is begun before terminating the deposition of the layer 14. This overlap provides an intermediate layer 20 which is made up of the metals comprising the layer 14 and the layer 15. This overlap layer 20 results in the desired bond between the layers 14 and 15 which is evidenced by desired electrical and mechanical connection properties. For purposes of better understanding, a representative third layer 15 may be 9,000 angstroms in thickness while the overlap layer 20 may be 200 angstroms in thickness.

One particular advantage of the connection structure and process of this invention is the simplicity, and therefore, economy, for not only providing connection at a single connection point in an electrical device, but also for providing coincident connection structure on an electronic device which may have several connection points. These connection points may take the form of termination as well as interconnections. The cross-sectional view shown at FIG. 3 illustrates one of these interconnections.

Figure 3:
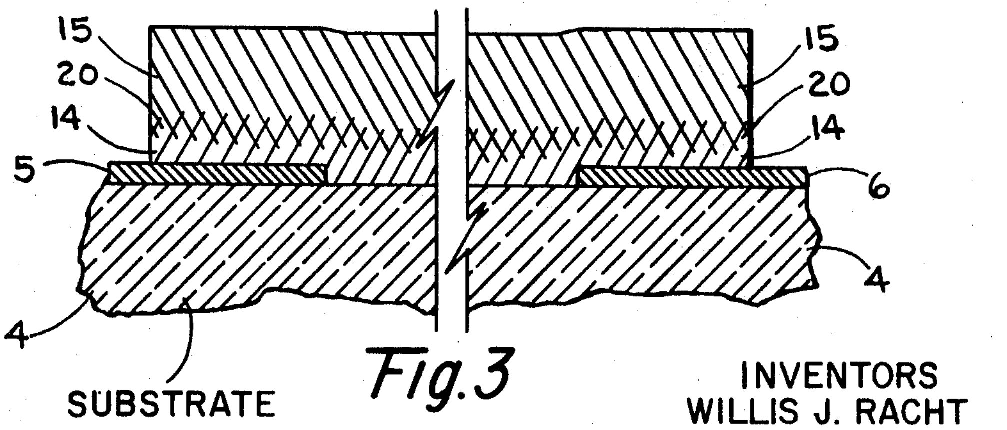
FIG. 3 is a cross section taken at the section line 3—3 of FIG. 1 to show the invention as it might appear as an interconnection.

In the FIG. 3 the connection with the resistive layers 5 and 6 by way of the layers 14, 15 and the intermediate layer 20 is the same as has been described with respect to the FIG. 2. However, for this interconnection, the mask which exposes those portions of resistive layers 5 and 6 for deposition of connection layer 14, also expose the path which the conductor between resistive layers 5 and 6 is to take. Thus, the connecting layer 14 is deposited upon the substrate 4 as well as the resistive layers 5 and 6. Based upon the normally used substrate materials, such as the electrical borosilicate glasses or aluminas, it has been shown that superior bonding with the substrate occurs when using the metals which are to be found in the connection layer 14.

Certain of the metals suggested for the second layer 15 will also provide good conductor materials. The deposition for this second layer 15 is the same as previously described for FIG. 2. In an electrical device such as 2 of the drawings wherein both a termination and an interconnection are to be found, the invention provides a simple process to establish connection at the termination and interconnection as well as provide the necessary conductor at the interconnections. There is no need for the usual multiple product handling to accomplish each of these results.

When evaluating a connection in an electrical device, several factors are to be considered. It has been previously mentioned that mechanical strength is important. This is reflected in a determination as to whether the connection will peel from the electrically functioning portion during the life of the product. Or, it may be possible to physically pull the connection from the electrical functioning portion by way of exerting a certain predetermined force upon the lead 8, for example. The electrical properties of a satisfactory connection can be generally characterized as incorporating good ohmic contact between the connecting portions. Generally, this ohmic contact is reflected in the determination of the change of the electrical properties of the electrical functioning portion when measured with and without the connection. It is desirous that little, if any change, is seen in these electrical properties after the connection is added. Additionally, a parameter known as temperature coefficient and identified as TC must be evaluated with and without the connection materials. In the case of a resistor, this TC is designated TCR (temperature coefficient of resistance) which measures the change in resistance as a function of temperature change experienced by the electrical device and is measured in parts per million per degree centigrade. One additional factor in evaluating satisfactory connection is referred to as load life change which reflects the change in the electrical properties of the electrically functioning portion and its connection when subjected to a particular operating electrical load for a given time. A minimum change is desired which minimum change necessitates a satisfactory connection.

Taking these parameters into consideration, the following example will help to better understand the invention.

Utilizing known vacuum deposition technology, a resistance layer such as 5 or 6 comprising 65 percent by weight chromium and 35 percent by weight cobalt was deposited upon a substrate such as 4 made from a glass manufactured by Corning Glass Works and identified as 7059 glass. This resistance layer and substrate were then stabilized with an air-bake at 300° C.

The resistive layer was then mechanically masked so as to expose only those portions of the layer which are to be a part of the connection. This masked unit was placed in a vacuum chamber with two sources of metals to be deposited, viz titanium and copper. During deposition the pressure in the vacuum chamber averaged $5\times10^{16}$ Torr. and the substrate temperature averaged 200° C.

First the deposition of the titanium began using known technology. The deposited layer was monitored by suitable equipment to indicate the resistance of the connecting layer being deposited The titanium was deposited until a predetermined resistance per square was achieved at which time the copper deposition was begun. When a second predetermined resistance per square was achieved the deposition of the titanium was stopped or phased out while the copper deposition continued to a third predetermined resistance per square value whereupon copper deposition was terminated. In one run, the copper deposition was begun with a reading of 310 ohms per square and the titanium deposition was phased out at 60 ohms per square while in another run these respective values were 3,100 ohms per square and 300 ohms per square. In each run, the copper deposition was terminated at 0.1 Xohms per square.

The test results from each of these runs showed a TCR of 0 ± 5p.p.m./° C. and a load life change of less than 0.1 percent after 1,000 hours at 125° C. when under rated load. It should be noted that the substrate with its resistive layer and connection, including terminal, was encapsulated with D. C. 3140 Resin manufactured by Dow Corning Company before these tests were conducted. The tests evidenced a satisfactory ohmic contact and satisfactory mechanical performance.

We claim:

1. A connection for an electrical device comprising:

a. a substrate, b. a first layer supported on said substrate and comprising chromium, c. said first layer comprising at least two termination ends with the portion of said first layer between said termination ends being continuous and constituting an electrically functioning resistor, and d. a connection layer disposed on and bonded to at least one said termination end of said first resistor layer forming an ohmic contact and comprising metals taken from the group consisting of titanium, zirconium, tantalum and combinations thereof.

2. The connection of claim 1 wherein said chromium comprises more than 40 percent by weight of said first layer.

3. the connection of claim 1 wherein said first layer is substantially entirely made of the metals cobalt and chromium in proportions of 40 to 80 percent by weight of chromium and substantially the entire balance cobalt.

4. the connection of claim 1 wherein said connecting layer is at least 200 angstroms in thickness.

5. The connection of claim 1 wherein said metals comprise at least 20 percent by weight of said connection layer.

6. The connection of claim 1 wherein a third conductive layer is bonded to said connection layer.

7. the connection of claim 6 wherein said third conductive layer comprises a metal which is compatible with solder.

8. The connection of claim 7 wherein said third layer comprises metals taken from the group consisting of copper, nickel, silver, gold and combinations thereof.

9. an electric device comprising, a. a substrate, b. at least one layer on said substrate which is electrically functioning and supported by said substrate and comprising chromium, c. at least one termination end and at least one interconnection end, with the portion of said first layer between said termination end and said interconnection end being continuous and constituting an electrically functioning resistor d. each said connection comprising a second layer disposed on and bonded to said termination end and said interconnection end forming an ohmic contact and comprising metals taken from the group consisting of titanium, zirconium, tantalum and combinations thereof, and e. a third layer bonded to said second layer comprising materials which are solder compatible and good electrical conductors.

10. the electrical device of claim 9 wherein said third layer comprises a metal taken from the group consisting of copper, nickel, silver, gold and combinations thereof.

* * * * *